United States Patent
Pohnlein

(10) Patent No.: US 11,828,357 B2
(45) Date of Patent: Nov. 28, 2023

(54) OIL SUPPLY SYSTEM FOR AN AUTOMATIC TRANSMISSION

(71) Applicant: ZF Friedrichshafen AG, Friedrichshafen (DE)

(72) Inventor: Florian Pohnlein, Stefansfeld (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/519,714

(22) Filed: Nov. 5, 2021

(65) Prior Publication Data
US 2022/0145981 A1 May 12, 2022

(30) Foreign Application Priority Data
Nov. 6, 2020 (DE) ...................... 10 2020 213 955.5

(51) Int. Cl.
*F16H 57/04* (2010.01)

(52) U.S. Cl.
CPC ....... *F16H 57/0413* (2013.01); *F16H 57/045* (2013.01); *F16H 57/048* (2013.01); *F16H 57/0449* (2013.01)

(58) Field of Classification Search
CPC ............. F16H 57/0413; F16H 57/0449; F16H 57/045; F16H 57/048; F16H 57/0447; F16H 61/0009; F16H 57/0435; F16H 2061/0037; F16K 31/002
See application file for complete search history.

(56) References Cited

U.S. PATENT DOCUMENTS

| | | | | |
|---|---|---|---|---|
| 4,114,571 A | * | 9/1978 | Ruf | F01P 7/14 123/196 AB |
| 4,883,225 A | * | 11/1989 | Kitchens | G05D 23/1333 236/DIG. 5 |
| 5,217,085 A | * | 6/1993 | Barrie | F01M 1/16 184/6.12 |

(Continued)

FOREIGN PATENT DOCUMENTS

| | | |
|---|---|---|
| DE | 4041253 C2 | 6/1992 |
| DE | 102019211854 A1 | 2/2021 |

OTHER PUBLICATIONS

German Search Report DE 10 2020 213 955.5, dated Apr. 23, 2021. (10 pages).

*Primary Examiner* — Michael A Riegelman
(74) *Attorney, Agent, or Firm* — Dority & Manning, P.A.

(57) ABSTRACT

An oil supply system of an automatic transmission includes a reservoir (1) for accommodating and storing a liquid operating medium (6), a volume compensation tank (102), and a valve device (20) for establishing or interrupting a hydraulic connection (3) between the volume compensation tank (102) and the reservoir (1). The volume compensation tank (102), in the installed position of the automatic transmission, is arranged above the reservoir (1). The hydraulic connection (3) between the volume compensation tank (102) and the reservoir (1) is automatically establishable or interruptable by the valve device (20) as a function of a temperature. The valve device (20) is configured such that the temperature at which the valve device (20) is in the open condition is lower than the temperature at which the valve device (20) is in the closed condition and, thereby, the hydraulic connection (3) is at least partially interrupted.

14 Claims, 6 Drawing Sheets

(56) References Cited

U.S. PATENT DOCUMENTS

| | | | | |
|---|---|---|---|---|
| 5,427,132 | A * | 6/1995 | Fenner, Jr. | G05D 16/0669 |
| | | | | 137/79 |
| 6,149,037 | A * | 11/2000 | Berrend | F16N 7/00 |
| | | | | 222/326 |
| 7,654,241 | B2 * | 2/2010 | Kobayashi | F01M 5/001 |
| | | | | 184/104.2 |
| 8,109,242 | B2 * | 2/2012 | Deivasigamani | F01P 7/16 |
| | | | | 123/41.1 |
| 8,191,794 | B2 * | 6/2012 | Sasaki | F01P 11/02 |
| | | | | 236/100 |
| 8,342,418 | B2 * | 1/2013 | Kanzaka | G05D 23/1333 |
| | | | | 236/93 R |
| 9,206,944 | B2 * | 12/2015 | Poster | B64C 27/12 |
| 9,816,601 | B2 * | 11/2017 | Poster | F16K 31/1221 |
| 10,655,726 | B2 * | 5/2020 | Poster | F16H 57/045 |
| 2008/0210491 | A1 * | 9/2008 | Mori | F01M 11/0004 |
| | | | | 184/106 |
| 2009/0014248 | A1 * | 1/2009 | Yamashita | F16H 57/0447 |
| | | | | 184/26 |
| 2011/0036200 | A1 * | 2/2011 | Curtis | F16H 57/0447 |
| | | | | 74/606 R |
| 2015/0211395 | A1 * | 7/2015 | Gooden | F01P 11/08 |
| | | | | 236/34.5 |
| 2015/0285369 | A1 * | 10/2015 | Benson | F16K 31/002 |
| | | | | 251/11 |
| 2018/0038474 | A1 * | 2/2018 | Poster | F16N 7/00 |
| 2020/0217305 | A1 * | 7/2020 | Broccolini | F16K 31/002 |
| 2020/0263597 | A1 * | 8/2020 | Lee | F04D 15/0022 |
| 2022/0074484 | A1 * | 3/2022 | Reid | F16H 57/0449 |
| 2022/0145981 | A1 * | 5/2022 | Pöhnlein | F16H 57/048 |

\* cited by examiner

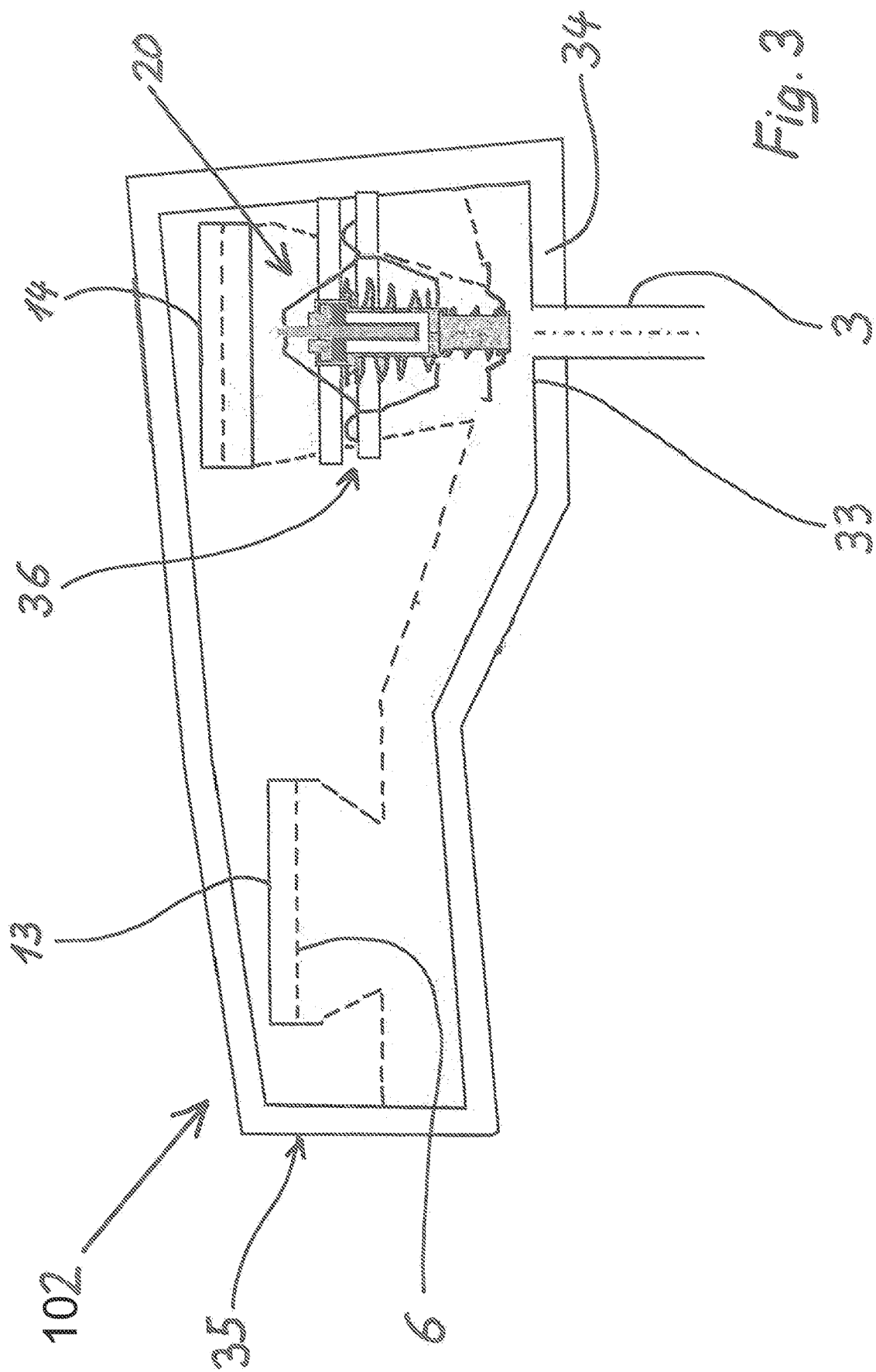

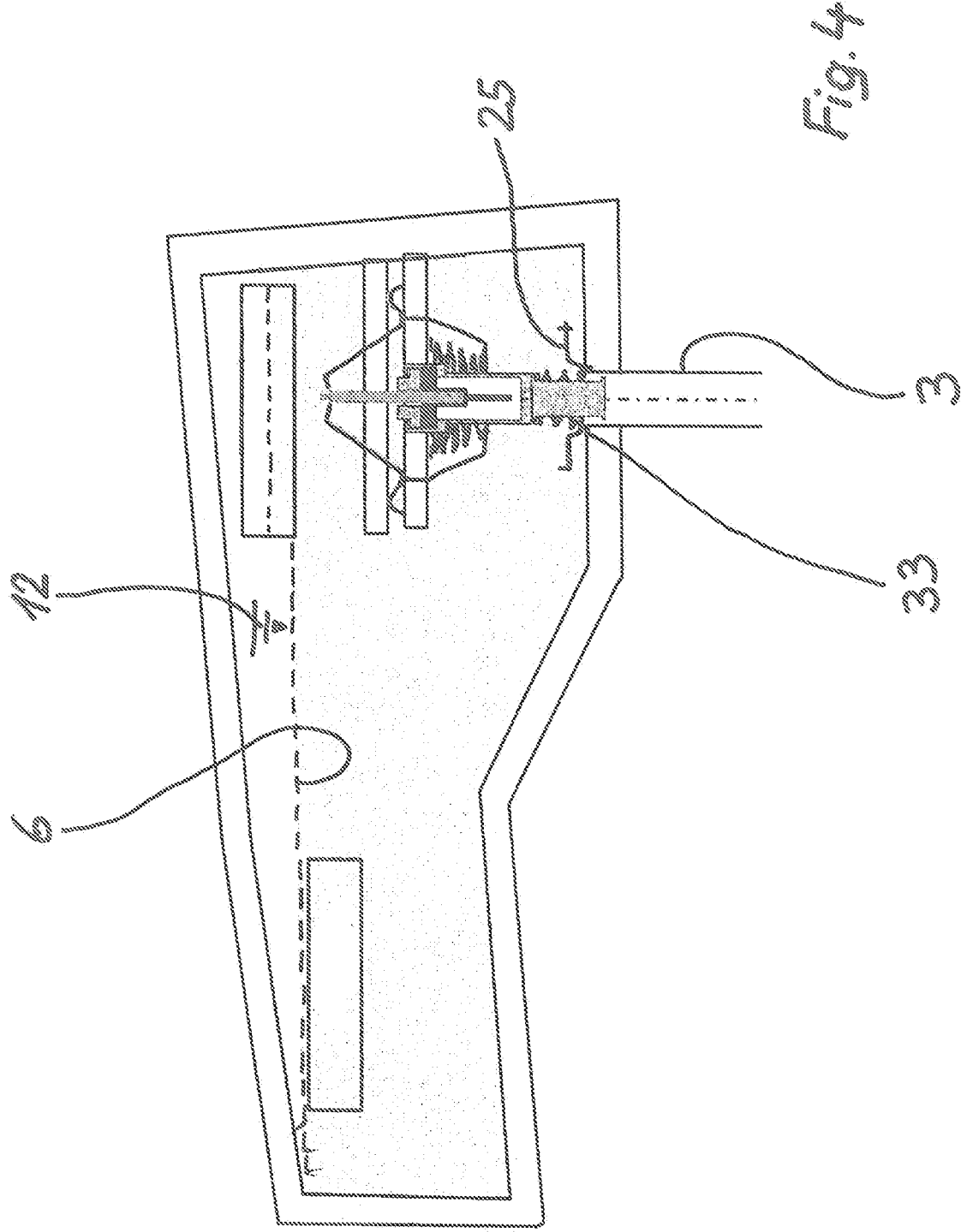

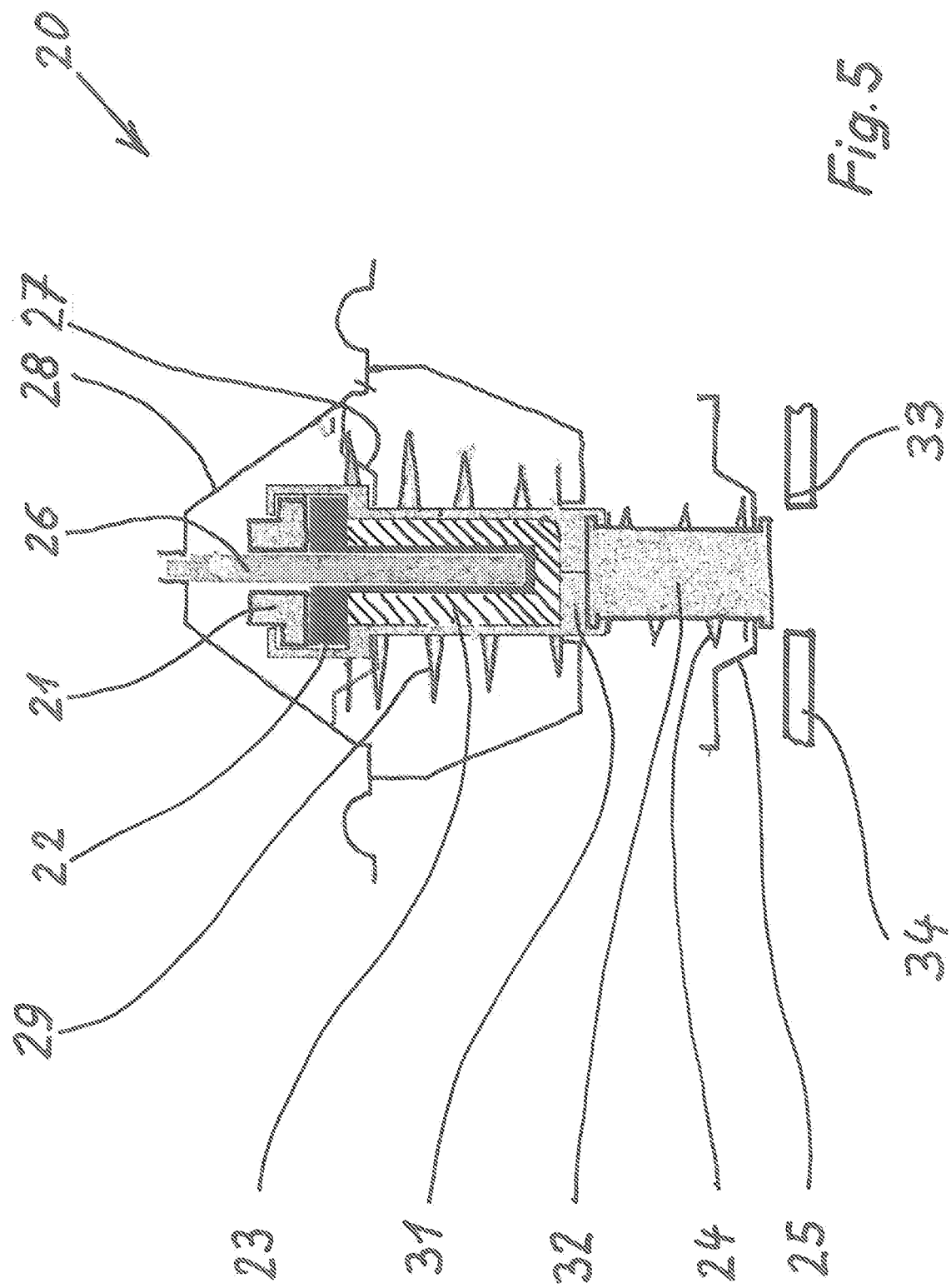

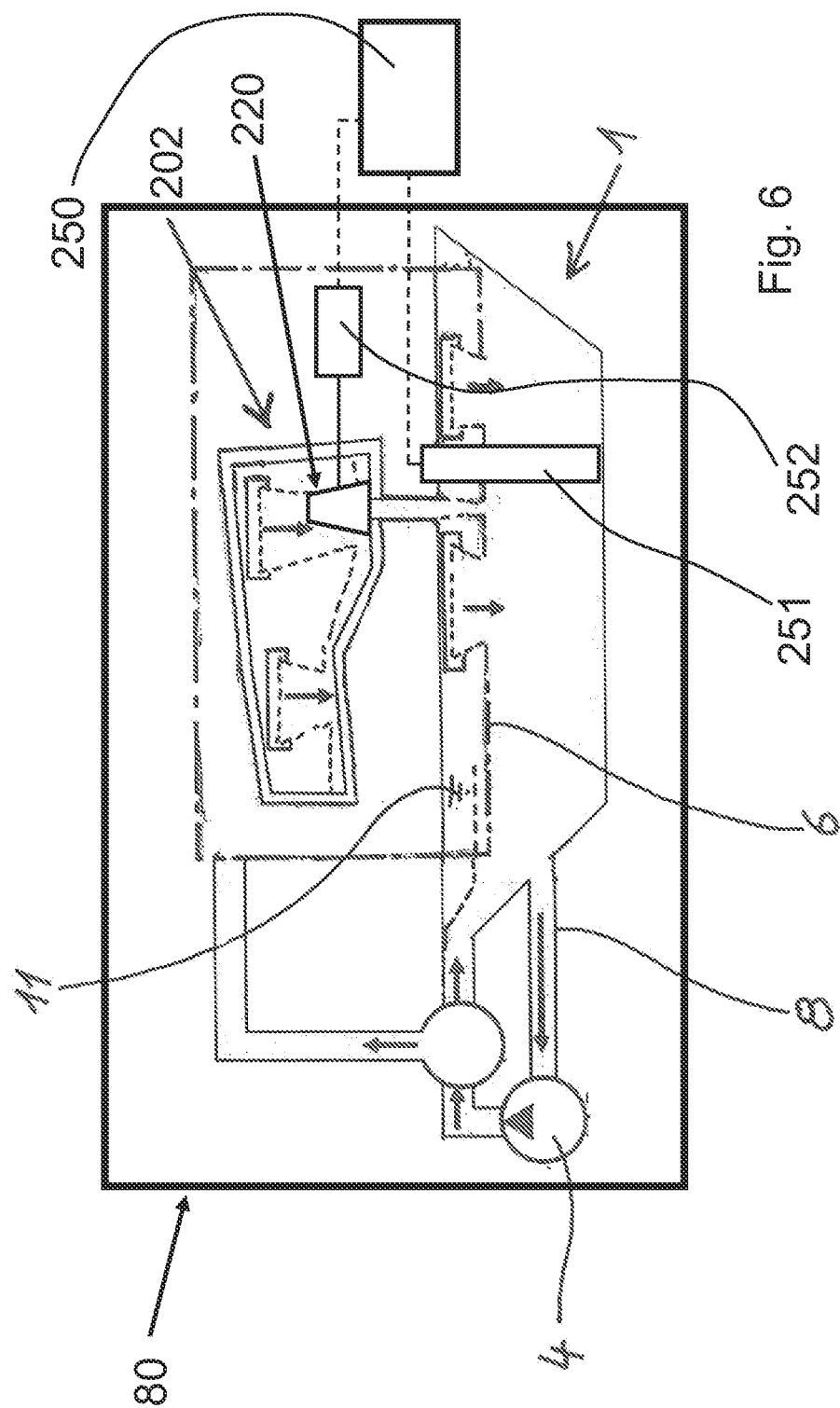

OIL SUPPLY SYSTEM FOR AN AUTOMATIC TRANSMISSION

CROSS-REFERENCE TO RELATED APPLICATION

The present application is related and has right of priority to German Patent Application No. 102020213955.5 filed in the German Patent Office on Nov. 6, 2020, which is incorporated by reference in its entirety for all purposes.

FIELD OF THE INVENTION

The invention relates generally to an oil supply system of a transmission, including a reservoir for accommodating and storing a liquid operating medium, and a volume compensation tank fillable from the cooling oil/lube oil flow and/or the operating medium slung off from the rotating parts, and an automatic transmission including an oil supply system of this type.

BACKGROUND

Publication DE 40 41 253 C2 of the applicant describes an automatic transmission, which includes an oil supply system for cooling and lubricating transmission components, such as, for example, the gear sets, and for pressurizing the shift elements. The oil supply system in this case includes a reservoir—also referred to as an oil pan or oil sump—formed at the bottom area of the transmission housing, from which a transmission pump delivers the operating medium to a hydraulic control unit. There, the operating medium, usually transmission oil, is transferred to the consumers.

With respect to the automatic transmission, the fill level or the oil level in the oil pan is not permitted to be set too low, and so, despite a falling fill level, no air is drawn in by the oil pump during operation also at very low temperatures or during strong accelerations, decelerations, or lateral accelerations during cornering. The negative consequences of an intake of air are, at least, cavitation in the transmission pump and the associated noise problems and damage of the transmission pump and the rest of the hydraulic system. In addition, due to the intake of air, the pressure generated by the transmission pump can collapse, and so the automatic transmission is no longer operable.

On the other hand, the fill level is also not permitted to be set too high, since rotating parts of the transmission cause disadvantageous churning losses and oil foaming otherwise. Churning losses result in increased power losses during direct drive by the automatic transmission and, thereby, a poor transmission efficiency. Oil foaming causes cavitation processes in the transmission pump, which generate undesired noises, pressure variations and material destruction, and, thereby, wear. High oil temperatures also support an excessively high fill level. In order to implement a balanced fill level, it is known with respect to automatic transmissions to lower the oil pan toward the vehicle floor in order to thereby increase the amount of oil to be filled and, thereby, prevent a fill level that is too low, on the one hand, and prevent an immersion of rotating transmission parts on the other hand. The possible lowering of the oil pan position is considerably limited, however, with respect to the established underbody ground clearance of the vehicle.

Automatic transmissions designed as hybrid transmissions include a hydraulically shiftable planetary transmission as the transmission gear set and an electric motor as well as a power electronics unit, which are all situated within the transmission housing. The integration of these hybrid transmission elements takes up larger and larger volumes within the available installation space of the transmission housing. As a result, among other things, the installation space for the transmission oil sump functioning as a reservoir for the operating medium must be reduced and the necessary transmission oil for lubrication, cooling, and actuators is stored, in part, decentrally at the transmission, at least intermittently in a volume compensation tank. The volume compensation tank is filled with lube oil or cooling oil slung off from the rotating transmission components, which enters the volume compensation tank through openings in the transmission housing. One further possibility is to fill the volume compensation tank via the lube oil/cooling oil circulation, which is generated by the transmission pump.

The volume compensation tank is arranged, in the installed position of the transmission, above the transmission oil sump and, in fact, in such a way that the level of the operating medium in the volume compensation tank is situated above the level of the operating medium in the oil sump. In addition, a hydraulic connection, for example, through a duct, exists between the volume compensation tank and the reservoir. As a result, the operating medium, usually transmission oil, can flow into the reservoir from the volume compensation tank under the effect of gravity.

A hydraulic connection can be understood to mean, in this context, for example, a line, a duct, a connecting opening, or a bore hole. The terms "higher" and "above" relate, in this context, to the distance perpendicular to the earth's surface.

It is disadvantageous here, however, that, at low oil temperatures, the transmission oil drains out of the volume compensation tank only slowly or in an insufficient amount due to the increased viscosity, and so, at low temperatures, such as, for example, during a cold start, the operating medium can be present in the reservoir at such a low level that it is possible that the transmission pump intakes air. The consequences thereof are, in addition to a low delivery rate of the transmission pump, cavitation and, thereby, conspicuous noise characteristics as well as an increased pressure pulsation and wear in the pump, which ultimately causes damage in the transmission pump.

At elevated temperatures of the operating medium, the viscosity is correspondingly lower, and so the transmission oil flows more easily out of the volume compensation tank into the oil sump and the level in the reservoir increases in comparison to low temperatures. This results, undesirably, in higher churning losses and, thereby, power losses in the transmission, since rotating transmission parts dip into the stored transmission oil during operation. An oil supply system of this type, according to the prior art, is diagrammatically represented for various temperatures in FIGS. 1 and 2 herein.

For these reasons, a switchable valve ("accumulator valve") was provided between the volume compensation tank and the reservoir in the patent application DE 10 2019 211 854 of the applicant, which was not previously published. This requires, however, an increased design complexity at hydraulic lines and, depending on the embodiment, an electronic controller as well as sensor systems.

SUMMARY OF THE INVENTION

Example aspects of the invention provide an oil supply system for a transmission, which includes a valve device that acts as an accumulator valve, in the case of which the level of the operating medium in the reservoir is automatically adjustable, according to demand, as a function of the temperature, and wherein the valve device is simply designed.

The temperature in this case is preferably the oil temperature, i.e., the temperature of the operating medium. Alternatively, a component temperature could also be utilized, preferably of a component that is in contact with the operating medium.

Accordingly, an oil supply system of a transmission, in particular of an automatic transmission, includes a reservoir for accommodating and storing a liquid operating medium, and a volume compensation tank fillable from the cooling oil/lube oil flow and/or the operating medium slung off from the rotating parts, for example, from a transmission gear set. The oil supply system also includes a valve device, which is arranged between the volume compensation tank and the reservoir and by which a hydraulic connection between the volume compensation tank and the reservoir is establishable or interruptable.

In the installed position of the automatic transmission, the volume compensation tank is arranged at least partially higher than the reservoir, and so the level of the operating medium in the volume compensation tank is situated above the level of the operating medium in the reservoir in all operating conditions, and so, when a hydraulic connection exists between the volume compensation tank and the reservoir, the operating medium can flow from the volume compensation tank into the reservoir under the effect of gravity.

According to example aspects of the invention, the hydraulic connection between the volume compensation tank and the reservoir is automatically establishable or interruptable by the valve device as a function of a temperature, wherein, in an open condition of the valve device, the operating medium can flow out of the volume compensation tank into the reservoir under the force of gravity. Here, the temperature at which the valve device is in the open condition is lower than the temperature at which the valve device is in the closed condition and, thereby, the hydraulic connection between the volume compensation tank and the reservoir is interrupted.

Preferably, the valve device includes an expansion element, the volume or shape of which changes as a function of the temperature, wherein the valve device is designed in such a way that the through-flow cross-section of the valve device changes as a function of a temperature of the expansion element.

An expansion element can be, for example, a wax, a liquid, or a metal alloy that undergoes a change in shape or length during a temperature change. Bimetals are one example of a metal alloy. The advantage of an expansion element of this type is that the valve device can be actuated without an additional energy source and without a controller with associated hardware- and software-related complexity, since the expansion element and, thereby, the actuating force are generated directly from the temperature surrounding the expansion element. The expansion element therefore combines the advantages of a sensor (reaction to temperature change) and of an actuator (displacement or actuation of the valve device via deformation of the expansion element).

In one particularly preferred example embodiment, the valve device includes, in addition to the expansion element, a built-in housing, a cover plate, and a valve seat, wherein the built-in housing and the valve seat are fixed at least in the direction of motion of the cover plate, and wherein the cover plate is movable in relation to the built-in housing and the valve seat. In this example embodiment, the cover plate is connected to the expansion element in such a way that the distance of the cover plate to the valve seat and, thereby, the through-flow cross-section of the valve device change when the expansion element undergoes a change in shape or length.

Preferably, the valve device is designed in such a way that the through-flow cross-section of the valve device decreases as the temperature of the expansion element increases.

When the through-flow cross-section decreases, the flow resistance of the valve device increases. As the flow resistance increases, the flow rate through the valve device decreases. As a result, advantageously, more oil flows into the reservoir at low temperatures, and so the oil level increases and, thereby, the intake of air by the transmission pump is avoided.

At higher temperatures, more oil is retained in the volume compensation tank due to the increased flow resistance, since a smaller flow drains into the reservoir. Therefore, an increase of the level in the reservoir is avoided and, thereby, the churning, for example, of the parts of the transmission gear set in the oil is avoided.

In one further preferred example embodiment, the volume compensation tank is closed at a certain temperature and, thereby, the hydraulic connection between the volume compensation tank and the reservoir is at least partially interrupted.

The expression "at least partially" is to be understood in this context to mean that the valve device either completely closes off the volume compensation tank with respect to the reservoir, or that a certain amount of leakage is possible.

Preferably, it is also possible that the through-flow cross-section through the valve device is selected as a function of the temperature in such a way that a flow rate through the valve device results, at which an oil level in the reservoir sets in, at which air is not drawn in by the transmission pump, nor do rotating transmission parts dip into the operating medium.

One further preferred example embodiment shows that the valve device is arranged at least partially within the volume compensation tank. As a result, the valve device advantageously takes up no additional installation space.

In another example embodiment, the maximum through-flow cross-section of the valve sets in at the lowest arising temperature and is selected in such a way that the operating medium flows from the volume compensation tank into the reservoir under the force of gravity also with the viscosity setting in at this temperature. As a result, no operating medium collects in the volume compensation tank and the reservoir is maximally filled, and so the intake of air is avoided specifically, for example, during a cold start.

Preferably, an ambient temperature of the valve device is effective upon the expansion element. As a result, the valve device can be actuated according to demand, i.e., according to the particular oil temperature, without requiring a sensor system.

Alternatively, a temperature of a heat source is effective upon the expansion element.

In this context, it is provided that the temperature of the heat source is adjustable by a control unit.

In this connection, it is preferably possible that the oil supply system includes a level sensor for measuring the level in the reservoir or a temperature sensor for measuring the temperature of the operating medium.

Preferably, an automatic transmission includes an above-described oil supply system, wherein the reservoir and the volume compensation tank are at least partially formed at a transmission housing. This enables a compact configuration without or with only minimal additional installation space.

In a method for operating an oil supply system, which includes a heatable and, thereby, activatable expansion element, it is possible that the expansion element is heated upon the exceedance of a certain value of the level of the reservoir or upon the exceedance of a certain temperature of the operating medium.

BRIEF DESCRIPTION OF THE DRAWINGS

Exemplary embodiments of an oil supply system according to example aspects of the invention are described in greater detail in the following, in which FIG. 3 shows a schematic of an oil supply system according to example aspects of the invention at a low temperature, FIG. 4 shows a schematic of an oil supply system according to example aspects of the invention at a higher temperature, FIG. 5 shows a diagrammatic sectioning of a valve device of an oil supply system according to example aspects of the invention, and FIG. 6 shows a schematic of a further embodiment of an oil supply system according to example aspects of the invention.

DETAILED DESCRIPTION

Figure 1:
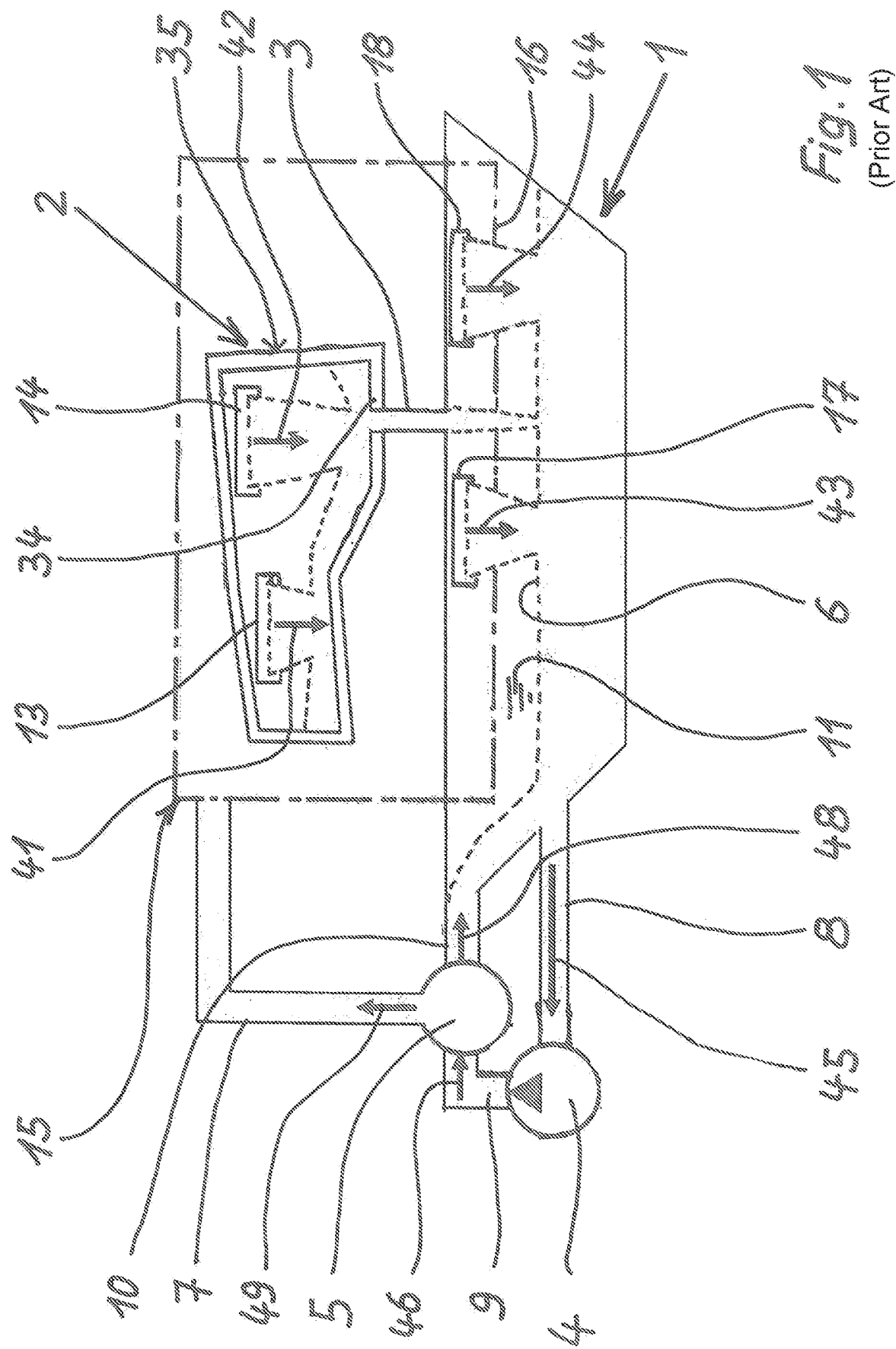
FIG. 1 shows a schematic of an oil supply system according to the prior art at a low temperature.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of an oil supply system of an automatic transmission according to the prior art. The oil supply system includes a reservoir 1, a volume compensation tank 2, a transmission pump 4, a hydraulic control unit 5, and a transmission gear set 15 as one of the consumers. The spatial expansion of the transmission gear set 15 is roughly diagrammatically represented as a rectangular area having a dash-dotted border. An operating medium 6, usually transmission oil, is stored in the reservoir 1, which is also referred to as an oil sump or an oil pan.

The operating medium 6 is identifiable on the basis of an upper boundary of the operating medium 6 (dashed line). In this representation, the operating medium 6 is at a level 11 in the reservoir 1 at the lower temperature, such as that which arises, for example, during a cold start. During the operation of the automatic transmission, the transmission pump 4 draws in the operating medium 6 from the reservoir 1 as an intake oil flow 45 through a suction line 8. Through a pressure line 9, the transmission pump 4 delivers the operating medium as a hydraulic oil flow 46 to a hydraulic control unit 5, in which the operating medium is divided and adjusted to different pressures. A partial flow of the operating medium is delivered through a cooling oil/lube oil line 7 as a cooling oil/lube oil flow 49 to a transmission gear set 15. A smaller partial flow is delivered out of the hydraulic control unit 5, as a return flow 48, back into the reservoir 1.

Since the operating medium 6 is slung by the rotating parts of the transmission gear set 15 against the inner side of a transmission housing 80 (see FIG. 6) due to the arising centrifugal force, the operating medium 6 enters the volume compensation tank 2 through filling openings 13 and 14 as filling oil flows 41 and 42. A further portion of the slung-off cooling oil/lube oil is returned directly into the reservoir 1 through oil return openings 17 and 18.

The volume compensation tank 2 and the reservoir 1 are hydraulically connected to each other by a connecting duct 3, and so the operating medium collecting in the volume compensation tank 2 can flow into the reservoir under the effect of gravity. In order to enable a complete emptying of the volume compensation tank 2 into the reservoir 1, the connecting duct 3 opens into the volume compensation tank 2 at the lowest point of a volume compensation tank housing 35, namely in a housing bottom 34.

FIG. 1 shows the oil supply system at a low oil temperature, at which the viscosity of the transmission oil is relatively high in comparison to higher oil temperatures. The flow resistance through the connecting duct 3 increases as the temperature decreases, and so, depending on the level of the flow rate of the filling oil flows 41 and 42 of the operating medium, a level 12 in the volume compensation tank 2 rises, since the operating medium 6 cannot drain into the reservoir 1 faster than the operating medium 6 fills the volume compensation tank 2.

As a result, the operating medium 6 collects in the volume compensation tank 2 and is withdrawn from the reservoir 1, and so the level 11 in the reservoir 1 decreases. This can result in the above-described problem of the intake of air by the transmission pump 4.

Figure 2:
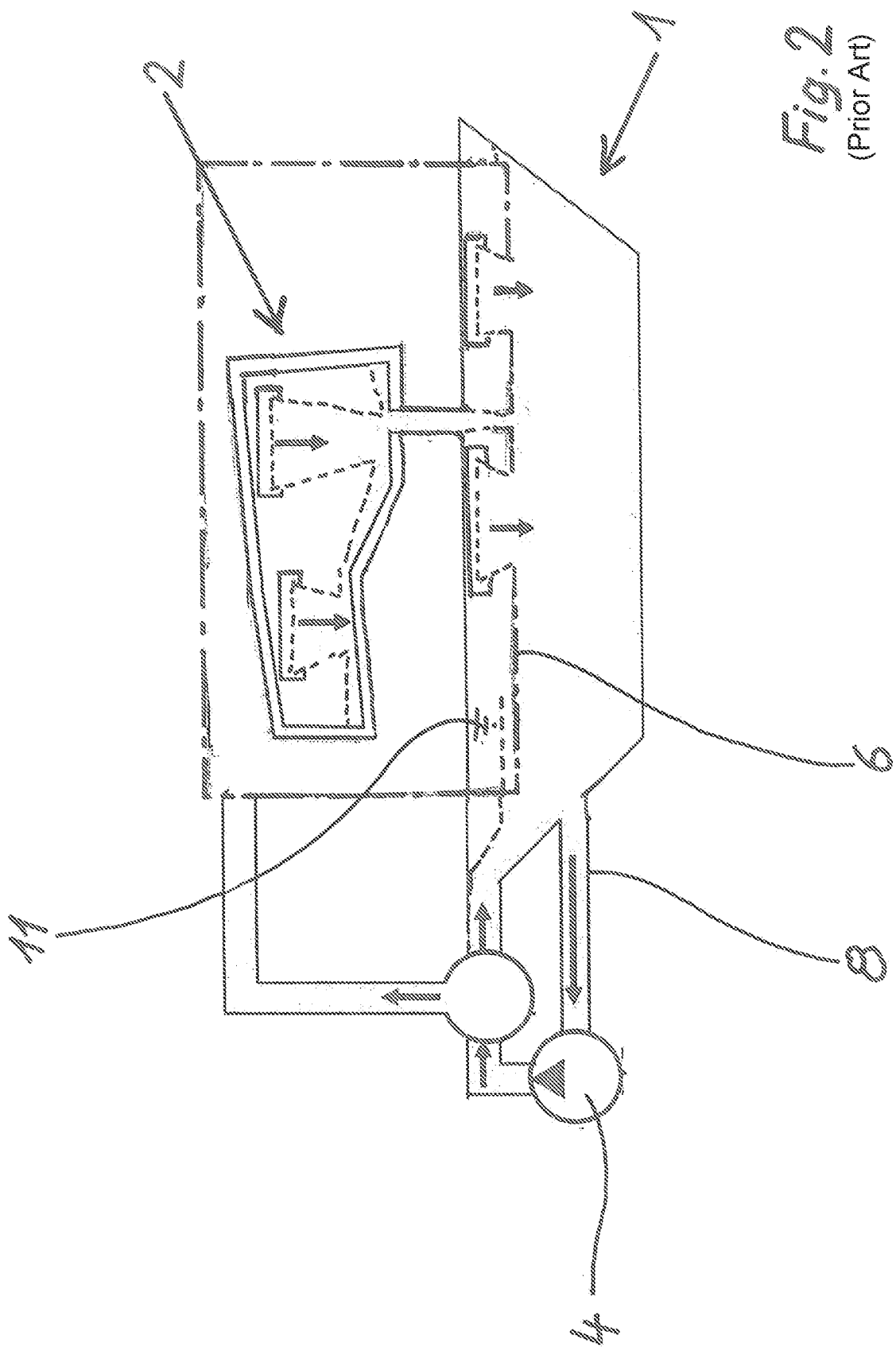
FIG. 2 shows a schematic of an oil supply system according to the prior art at a higher temperature.

If the oil temperature now increases during the operation of the transmission, the flow resistance of the connecting duct 3 decreases with the viscosity of the operating medium 6, and so the oil flows more easily into the reservoir 1, and so the level 12 in the volume compensation tank 2 decreases as compared to lower temperatures. In the extreme case, this can result in no more operating medium at all collecting in the volume compensation tank 2 and the level 11 in the reservoir 1 reaching a maximum. A condition of this type is represented in FIG. 2.

Theoretically, the problem of the intake of air would then no longer exist, since the suction line 8 is now securely situated below the level. However, the rise of the level 11 would result in the rotating parts of the transmission gear set 15 now dipping into the rising operating medium and churning therein. As a result, the torque loss in the transmission now increases, disadvantageously, and the transmission efficiency deteriorates. A further problem resulting from the churning is the introduction of air into the operating medium 6 and, thereby, foaming of the operating medium 6. The intake of churned oil has the same negative consequences as the intake of air.

These problems can be solved, in that the level 11 in the reservoir 1 remains in a range, within which neither an intake of air nor a churning of the transmission gear set 15 can occur.

FIG. 3 shows, in a schematic, a volume compensation tank 102 of an oil supply system according to example aspects of the invention. The volume compensation tank 102 essentially corresponds to the volume compensation tank 2 according to the prior art. In addition thereto, the volume compensation tank 102 includes a valve device 20, which is arranged within the volume compensation tank 102. Additionally, the volume compensation tank 102 includes a valve housing 36, at which the valve device 20 is fixed. The valve housing 36 is formed or fixed at the volume compensation tank housing 35.

The configuration of the valve device 20 is to be derived from FIG. 5. The valve device 20 essentially includes a cover plate 25, a built-in housing 28, and an expansion element 23. The valve device 20 also includes a valve seat 33, which is formed at the housing bottom 34 of the volume compensation tank housing 35. An expansion element housing 31, a guide piston 32, an operating piston 26, a return spring 29, and a compensation spring 24 are also provided.

The expansion element housing 31 accommodates the expansion element 23 and is fixedly connected to the guide piston 32. The cover plate 25 is arranged at the guide piston 32 so as to be axially displaceable with respect to the guide piston 32 and is preloaded by a compensation spring 24 against the lower end of the guide piston 32. These three components (the expansion element housing 31, the guide piston 32, and the cover plate 25) could theoretically also be designed as one piece, however, wherein the compensation spring 24 would then be omitted.

The operating piston 26 is connected to the built-in housing 28 so as to be fixed at least in the axial direction of the operating piston 26. All other described components are displaceable with respect to the operating piston 26 and the built-in housing 28 against the force of the return spring 29 in the direction of the longitudinal axis of the operating piston 26. The built-in housing 28 is connected to the valve housing 36 of the volume compensation tank housing 35 so as to be fixed at least in the axial direction relative to the operating piston 26.

When the expansion element 23 is heated, the volume of the expansion element 23 increases. Since the expansion element 23 is supported via the operating piston 26 on the built-in housing 28 and, thereby, on the valve housing 36 of the volume compensation tank housing 35, all further components of the valve device 20 shift in the direction of the valve seat 33. The cover plate 25 then comes to rest against the valve seat 33 and closes the connecting duct 3 between the volume compensation tank 102 and the reservoir 1. As soon as the cover plate 25 rests against the valve seat 33, the cover plate 25 is preloaded by the compensation spring 24 with an increasing force against the valve seat 33 as the expansion element 23 continues to expand. As a result, an excessive mechanical strain of the components is to be avoided when the cover plate 25 already rests against the valve seat 33 and the expansion element 23 expands even more as heating continues. This position of the valve device 20 is represented in FIG. 4.

If the oil temperature and, thereby, the temperature of the expansion element 23 fall below a certain value again, the volume of the expansion element 23 decreases and the return spring 29 pushes the components back that are movable with respect to the built-in housing 28, and so the cover plate 25 ultimately lifts off from the valve seat 33. Therefore, a hydraulic connection between the volume compensation tank 102 and the reservoir 1 is restored.

Due to the stepless adjustment of the distance between the cover plate 25 and the valve seat 33, the through-flow cross-section between the volume compensation tank 102 and the reservoir 1 constantly changes as a function of the oil temperature. As a result, given a suitable selection of the function of the through-flow cross-section as a function of the oil temperature and, thereby, as a function of the viscosity, the level 11 of the reservoir 1 can be held constant, at least partially or in sections.

FIG. 3 shows the position of the valve device 20 in the open position. The operating medium 6 flowing into the volume compensation tank 102 can drain into the reservoir 1 at a sufficient flow rate and, thereby, prevent the level 11 from dropping below a critical value, at which there is a risk that air will be drawn in.

FIG. 4 shows the valve device 20 in the closed position, which is assumed at a higher oil temperature. No operating medium can flow to the reservoir 1, and so the level 11 there does not increase further and the elements of the transmission gear set 15 cannot churn in the oil. The volume compensation tank 102 fills until the level 12 has reached a maximum, and no more operating medium can be taken in through the filling openings 13 and 14.

In addition to the described example embodiment, it can be possible to heat the expansion element by utilizing an electrical energy source, actuated by an electronic control unit. Therefore, it would be possible that the influence of the flow from the volume compensation tank to the reservoir takes place not only in a manner directly dependent on the oil temperature, but rather also as a function of arbitrary variables, such as, for example, the level. This would have to be detected by a sensor.

FIG. 6 shows a further embodiment of an oil supply system. This oil supply system includes a volume compensation tank 202 having a valve device 220 and, additionally with respect to the example embodiment described with reference to FIGS. 3 through 5, a sensor 251 for measuring the temperature of the operating medium or the level 11 in the reservoir 1, and a heat source 252, which can heat the expansion element 23. The measured temperature of the operating medium 6 or the level 11 of the reservoir 1 is logged in an electronic control unit 250, which then actuates the heat source 252 and, thereby, adjusts the valve device 220 to a desired level 11. The heat source 252 is preferably electrical.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 reservoir
2 volume compensation tank
3 connecting duct
4 transmission pump
5 hydraulic control unit
6 operating medium
7 cooling oil/lube oil line
8 suction line
9 pressure line
10 return line
11 reservoir level
12 volume compensation tank level
13 filling opening to the volume compensation tank
14 filling opening to the volume compensation tank
15 transmission gear set
16 lower boundary of transmission gear set
17 oil return to the reservoir 18 oil return to the reservoir
20 valve device
21 guide sleeve
22 seal
23 expansion element
24 compensation spring
25 cover plate
26 operating piston
27 valve spring retainer
28 built-in housing
29 return spring
31 expansion element housing
32 guide piston
33 valve seat
34 housing bottom
35 volume compensation tank housing
36 built-in housing receptacle
41 filling oil flow
42 filling oil flow
43 discharge oil flow
44 discharge oil flow
45 intake oil flow
46 hydraulic oil flow
48 return oil flow
49 cooling oil/lube oil flow
80 transmission housing
102 volume compensation tank
202 volume compensation tank
220 valve device
250 electronic control unit
251 sensor
252 heat source

The invention claimed is:

1. An oil supply system of a transmission, comprising:
a reservoir (1) for accommodating and storing a liquid operating medium (6);
a volume compensation tank (102) that, in an installed position, is arranged at least partially higher than the reservoir (1) such that a level (12) of the operating medium in the volume compensation tank (102) is disposed above a level (11) of the operating medium (6) in the reservoir (1) in all operating conditions; and
a valve device (20) for establishing or interrupting a hydraulic connection (3) between the volume compensation tank (102) and a reservoir (1),
wherein the volume compensation tank (102) comprises filling openings (13, 14) that are configured such that the operating medium is flowable into the volume compensation tank (102) from the reservoir (1) through the filling openings (13, 14) when rotating transmission components sling the operating medium against an inner side of a transmission housing (80), the filling openings (13, 14) separate from the hydraulic connection (3) between the volume compensation tank (102) and a reservoir (1),
wherein the hydraulic connection (3) between the volume compensation tank (102) and the reservoir (1) is automatically establishable or interruptable by the valve device (20) as a function of temperature,
wherein, in an open condition of the valve device (20), the operating medium is flowable out of the volume compensation tank (102) into the reservoir (1) under a force of gravity,
wherein, in a closed condition of the valve device (20), the hydraulic connection (3) between the volume compensation tank (102) and the reservoir (1) is interrupted, and
wherein a temperature at which the valve device (20) is in the open condition is lower than a temperature at which the valve device (20) is in a closed condition.

2. The oil supply system of claim 1, wherein the valve device (20) comprises an expansion element (23), a volume or shape of the expansion element (23) changes as a function of the temperature, and the valve device (20) is configured such that a through-flow cross-section of the valve device (20) changes as a function of a temperature of the expansion element (23).

3. The oil supply system of claim 2, wherein:
the valve device (20) further comprises a built-in housing (28), a cover plate (25), and a valve seat (33);
the built-in housing (28) and the valve seat (33) are fixed at least in a direction of motion of the cover plate (25);
the cover plate (25) is movable relative to the built-in housing (28) and the valve seat (33);
the cover plate (25) is connected to the expansion element (23) such that a distance of the cover plate (25) to the valve seat (33) and the through-flow cross-section of the valve device (20) change when the expansion element (23) changes shape or length.

4. The oil supply system of claim 2, wherein the valve device (20) is configured such that the through-flow cross-section of the valve device (20) decreases as the temperature of the expansion element (23) increases.

5. The oil supply system of claim 1, wherein the hydraulic connection between the volume compensation tank (102) and the reservoir (1) is interrupted at a certain temperature.

6. The oil supply system of claim 1, wherein a through-flow cross-section of the valve device (20) is selected as a function of the temperature such that a flow rate through the valve device (20) provides the level (11) in the reservoir (1) that air is not drawn into the transmission pump (4) and rotating transmission parts (15) do not dip into the level (11) in the reservoir (1).

7. The oil supply system of claim 1, wherein the valve device (20) is arranged at least partially within the volume compensation tank (102).

8. The oil supply system of claim 1, wherein an ambient temperature of the valve device (20) is effective upon an expansion element (23).

9. The oil supply system of claim 1, further comprising a heat source (252), wherein a temperature of the heat source (252) effective upon an expansion element (23).

10. The oil supply system of claim 9, further comprising a control unit (250), wherein the temperature of the heat source (252) is adjustable by the control unit (250).

11. The oil supply system of claim 10, further comprising a sensor (251) configured for measuring the level (11) in the reservoir (1) or for measuring the temperature of the operating medium (6).

12. The oil supply system of claim 1, wherein an expansion element (23) comprises a wax volume or a bimetal.

13. An automatic transmission, comprising the oil supply system of claim 1, wherein the reservoir (1) and the volume compensation tank (102, 202) are at least partially formed at the transmission housing (80).

14. A method for operating the oil supply system of claim 1, comprising heating an expansion element (23) upon exceeding a certain value of the level (11) of the reservoir (1) or upon exceeding a certain temperature of the operating medium (6).

* * * * *